EDP12 — Ethane-1,2-diphosphonate
STP — Sodium tripolyphosphate
PTP — Propane-1,2,3-Triphosphonate United States Patent Office 3,743,688
Patented July 3, 1973

3,743,688
PROCESS FOR PREPARING PROPANE TRIPHOS-
PHONIC LOWER ALKYL ESTERS
Allan D. Nicholson, Springfield Township, Hamilton
County, and Darrel Campbell, Fairfield, Ohio, assignors
to The Proctor & Gamble Company, Cincinnati, Ohio
Original application Dec. 27, 1967, Ser. No. 694,002.
Divided and this application Oct. 21, 1970, Ser.
No. 82,819
Int. Cl. C02b 5/06; C07f 9/40
U.S. Cl. 260—970
7 Claims

ABSTRACT OF THE DISCLOSURE

A class of vicinal polyphosphonates, propane-1,2,3-triphosphonates, are prepared by reacting a propargyl compound, such as propargyl alcohol, a hydrogen dialkylphosphite and an alkali metal promoter such as sodium at a temperature of about 20° C.–100° C. for from about 5 minutes to about 30 hours. The novel class of compounds consist of propane triphosphonic acid.

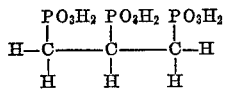

Figure 1:
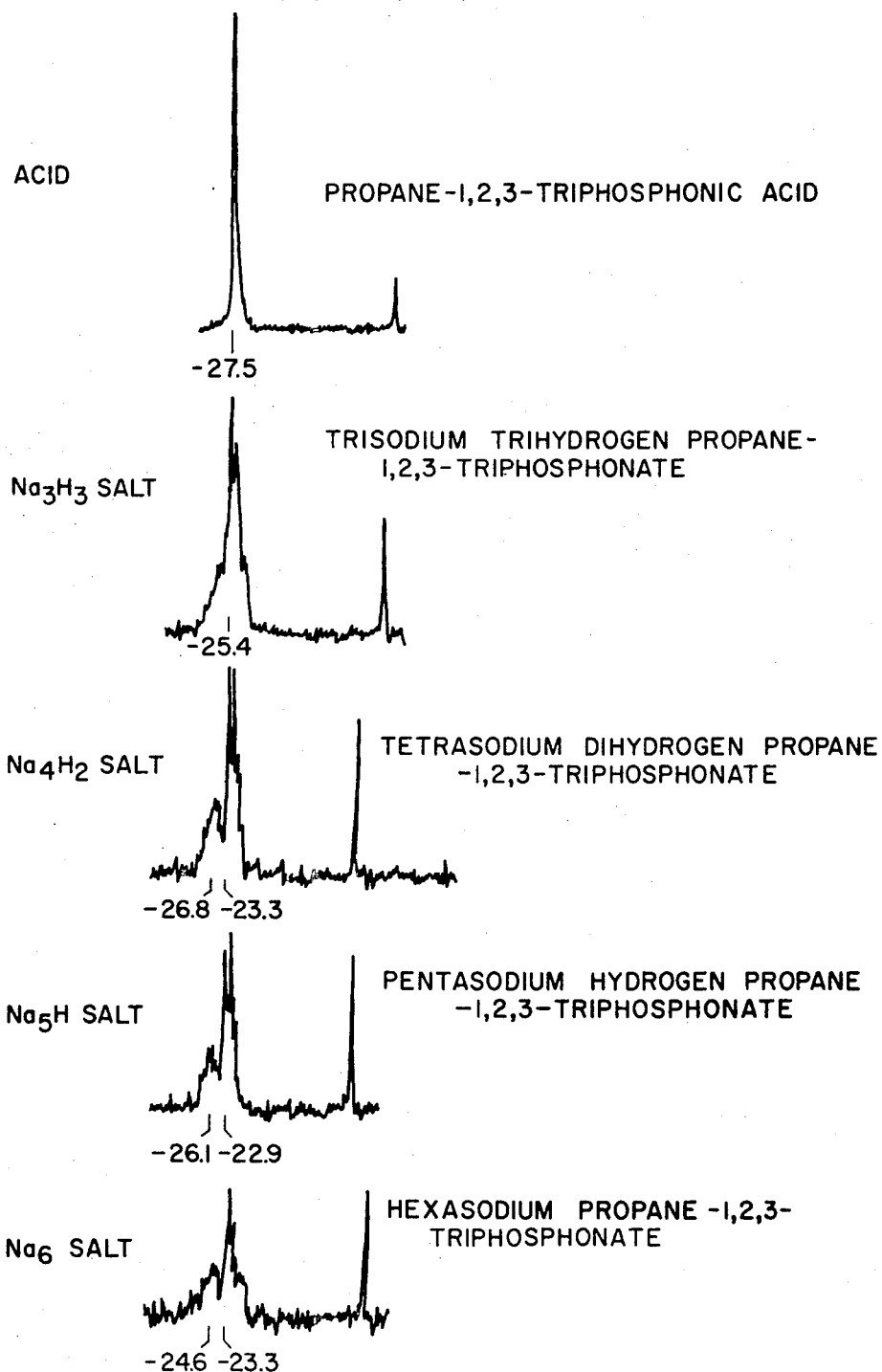

lower alkyl esters, and water soluble alkali metal salts thereof. The compounds are useful as detergency builders, sequestering agents, anti-calculus agents.

CROSS-REFERENCE TO RELATED APPLICATION

This is a division of application Ser. No. 694,002, filed Dec. 27, 1967, and now abandoned.

BACKGROUND OF THE INVENTION (1) Field of the invention

This invention pertains to vicinal polyphosphonates as a new class of organic phosphorus-containing compounds, and a novel process for their preparation. The process is described in terms of preparing the lower alkyl esters of propane-1,2,3-triphosphonic acid, which are readily converted to the free acid by hydrolysis and to salts by appropriate neutralization of the acids.

(2) Description of the prior art

Organic polyphosphonates are known in the prior art which are gem-diphosphonates such as methylenediphosphonic acid, $CH_2PO_3H_2$, e.g., U.S. Pat. 3,213,030; ethane-1-hydroxy-1,1-diphosphonic acid, $CH_3C(OH)PO_3H$, e.g., U.S. Pat. 3,159,581. In addition, other polyphosphonates are known in which a phosphonate group is attached to the terminal carbons of a long chain aliphatic compound, e.g., $CH_2(PO_3H_2)(CH_2)_nCH_2(PO_3H_2)$, e.g., U.S. Pat. 3,297,578.

No prior art propane compound is known, however, in which a single phosphonate group is attached to each carbon atom of the three carbon atoms. The present invention provides this class of compounds for the first time, together with a novel process for preparing such compounds as well as useful applications of such compounds.

SUMMARY OF THE INVENTION AND DESCRIPTION OF PREFERRED EMBODIMENTS

The present invention relates to and provides a new class of compounds having the following formula

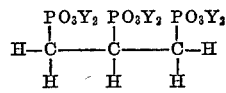

in which Y represents hydrogen, a lower alkyl radical containing from 1 to about 6 carbon atoms, or an alkali metal.

In the formula above, Y can be hydrogen and the resulting compound is propane-1,2,3-triphosphonic acid; Y can also be a lower alkyl radical containing from 1 to about 6 carbon atoms such as methyl, ethyl, n-propyl, isopropyl, n-butyl, iso-butyl, n-pentyl, iso-pentyl, n-hexyl, iso-hexyl, and the like. Such compounds are lower alkyl esters in which group can be straight chain or branch chain as noted in the preceding list. Illustrative ester compounds are hexamethyl propane - 1,2,3 - triphosphonate; hexaethyl propane-1,2,3-triphosphonate; hexapropyl propane-1,2,3-triphosphonate; hexaisopropyl propane - 1,2,3-triphosphonate; hexabutyl propane-1,2,3-triphosphonate; hexapentyl propane-1,2,3-triphosphonate; hexahexyl propane-1,2,3-triphosphonate, and the like. Y can also be an alkali metal such as sodium, potassium or lithium in which form the new compounds are salts. Illustrative examples of such salts are: monosodium pentahydrogen propane - 1,2,3 - triphosphonate; disodium tetrahydrogen propane-1,2,3-triphosphonate; trisodium trihydrogen propane-1,2,3-triphosphonate; tetrasodium dihydrogen propane - 1,2,3 - triphosphonate; pentasodium hydrogen propane-1,2,3-triphosphonate; hexasodium propane-1,2,3-triphosphonate; as well as the corresponding potassium and lithium compounds.

The compounds of the present invention are useful as detergency builders; and, in addition, as a class of compounds they possess interesting sequestering and solubility properties which make possible their use in numerous industrial and household applications, as well as anti-calculus agents in oral compositions.

An especially useful embodiment of the present invention comprises built detergent compositions in which the novel compounds, especially the acid and alkali metal salts thereof, are employed as detergency builders for a wide variety of organic detergents including anionic soap and non-soap, nonionic, ampholytic and zwitterionic synthetic detergents.

The sequestering properties of the compounds of this invention suggest their use as additives to water supplies in which hardness-imparting ions such as calcium, magnesium, iron and the like, represent a problem. It is well known that there are many industrial and household areas in which metal contaminants, even in trace amounts, represent such problems. A comprehensive discussion of properties and applications of sequestering agents is found in a text authored by Stanley Chabarek and Arthur E. Martell, entitled "Organic Sequestering Agents" (Wiley & Sons, 1959).

According to the present invention, it has now been discovered that vicinal propane-1,2,3-triphosphonate compounds can be prepared by reacting (A) a compound having the formula $H-C \equiv C-CH_2X$ in which X is selected from the group consisting of bromine, chlorine, iodine, hydroxyl, and ortho-tosyl, (B) a hydrogen dialkyl phosphite ester compound in which the alkyl group is a lower alkyl group containing from 1 to about 6 carbon atoms, and (C) a reaction promoter which is an alkali metal selected from the group consisting of sodium, potassium and lithium, or hydride thereof.

A general unbalanced equation for the reaction is as follows:

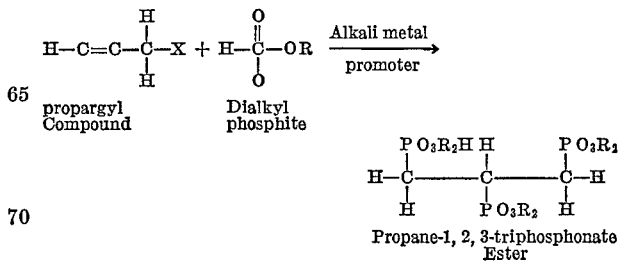

Propane-1, 2, 3-triphosphonate Ester in which X is bromine, chlorine, iodine, hydroxyl, or ortho-tosyl, and R is a lower alkyl group containing from 1 to about 6 carbon atoms, e.g., methyl, ethyl, propyl, isopropyl, n-butyl, iso-butyl, n-pentyl, iso-pentyl, n-hexyl, and iso-hexyl, and the like.

The propargyl compound containing the acetylenic bond can be propargyl bromide, propargyl chloride, propargyl iodide, propargyl alcohol, and propargyl orthotosylate. The preferred materials are propargyl alcohol and propargyl bromide. These are commercially available compounds derived from a base catalyzed reaction between acetylene and formaldehyde. They are liquids at room temperature. The present invention is discussed below in terms of propargyl alcohol, this compound being representative of this class of starting materials. The term "propargyl compounds" is also used at times as a matter of convenience when a statement applies broadly to all of the members of the hereinbefore disclosed acetylenic compounds.

The dialkyl phosphite compounds are also liquids at room temperature and are also readily available commercially. Illustrative examples are hydrogen dimethyl phosphite, hydrogen diethyl phosphite, hydrogen dipropyl phosphite, hydrogen diisopropyl phosphite, hydrogen dibutyl phosphite, hydrogen diisobutyl phosphite, hydrogen dipentyl phosphite and hydrogen dihexyl phosphite. The preferred compounds are hydrogen dimethyl phosphite, hydrogen diethyl phosphite and hydrogen diisopropyl phosphite.

The reaction requires a promoter which is an alkali metal or an alkali metal hydride. Specifically, the promoter can be sodium, potassium, lithium, sodium hydride, potassium hydride or lithium hydride. For convenience, the term "alkali metal promoter" is used below to encompass both the metals as well as the hydrides thereof.

While it is not absolutely essential to the exercise of the present invention, it is desirable to employ an inert, organic, non-protic solvent such as xylene, toluene, butyl ether and aliphatic saturated hydrocarbons having a boiling point in excess of about 60° C. Included among suitable hydrocarbons are straight chain or branch chain aliphatic compounds containing from about 7 to about 18 carbon atoms. Illustrative examples are heptane, octane, dodecane, tetradecane, octadecane, cycloheptane, cyclodecane, methylcyclohexane and the like. The solvent, in addition to being a solvent for the reaction product, also beneficially serves as a dispersing medium for the alkali metal promoter.

In order to obtain the maximum benefit from the present invention, it is desirable to employ the foregoing reactants and solvent in certain proportions. A clear understanding of the importance of the relative proportions requires a brief description of the theorized mechanics of the reaction. The stoichiometric proportion of the propargyl compound and the dialkyl phosphite on a molar basis is 1:3. However, one mole of the dialkyl phosphite reacts with one mole of the alkali metal promoter to form one mole of sodium dialkyl phosphite which is an essential reaction intermediate as explained below. Consequently, taking this into consideration, at least 4 moles of the hydrogen dialkyl phosphite should be used per mole of propargyl compound at the outset of the reaction. Greater amounts of the hydrogen dialkyl phosphite can be used but without offering any material advantage. A useful range of molar proportions of propargyl compound to hydrogen dialkyl phosphite is from about 1:4 to about 1:10, respectively, while a preferred range is from about 1:4 to about 1:6, propargyl compound to dialkyl phosphite.

The alkali metal promoter has two roles in the reaction. On the one hand, it is a reactant on an equimolar basis with the hydrogen dialkyl phosphite to form sodium dialkyl phosphite which, as just noted above, is a necessary material during the course of the reaction. In this way the alkali metal promoter also serves as a promoter or catalyst for the addition of the first two phosphonate groups across the acetylenic bond of the propargyl starting material at the outset of the reaction. The amount required to satisfactorily promote this catalyzed addition can be relatively small, i.e., as low as .05 to .3 equivalent of alkali metal promoter. Larger amounts, i.e., greater than .5 mole can also be used but without any material advantage. There may, in fact, be some slight disadvantage to using more than about .5 equivalent of the promoter because it may then react with reaction intermediates to form undesired by-products and thus decrease the overall yield of the desired triphosphonate reaction product. Taking into consideration the amount of alkali metal required (1) to promote or catalyze the diphosphonate addition reaction, and (2) to aid in the dehydration of alcoholic intermediates (1 equivalent) means that the overall process requires from about 1.05 to about 1.7 moles of alkali metal promoter per mole of propargyl compound and, preferably, 1.05 to about 1.5 moles of alkali metal promoter per mole of the propargyl compound.

The reaction can be carried out within a temperature range of from about 20° C. to about 100° C., but a range of about 50° C. to about 80° C. is preferred. Temperatures below 20° C. should not be used because the reaction would be too slow necessarily involving inordinately long reaction times; while reaction temperatures above 100° C. can result in decomposition of the reaction products and thereby decrease yields of desired products.

The reaction can take from about 5 minutes to about 30 hours but is preferably completed in from about 30 minutes to about 24 hours.

Although not absolutely essential, there is a preference for stirring the reaction mixture during the reaction as this affords better contact between the reactants and generally facilitates a smooth, efficient reaction.

So far as the reaction mechanism is concerned, it was not expected that the third phosphonate moiety would attach vicinally along the propane chain. Since the exact course of the reaction was unfamiliar, it was theorized that the reaction would probably proceed according to the following general equation using hydrogen dialkyl phosphite as an example:

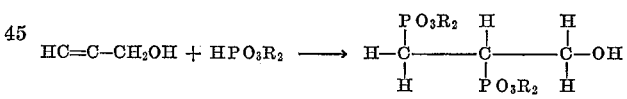

Attempts were made to isolate significant quantities of the above propane diphosphonate intermediate, but they were unsuccessful. It was thus unexpectedly discovered that in the presence of sodium dialkyl phosphite an unsaturated intermediate is formed which rapidly converts to a propane-1,2,3-triphosphonate ester. It was surprising to discover that water is so readily eliminated from the reaction in such an extremely facile reaction. This rapid dehydration seems to be peculiar to esters of the vicinal polyphosphonic acid, at least without using forced reaction conditions.

Recovery of the propane-1,2,3-triphosphonate esters is quite readily performed. Any method can be used but one convenient straightforward method is to add water to the reaction mixture to form an aqueous phase (in which all inorganic compounds, e.g., sodium hydroxide, will be dissolved) and an organic phase (containing the ester reaction products).

This two-phase mixture is readily separated by means of an ordinary separatory funnel. The remaining organic phase is distilled. First cuts contain, for example, such materials as unreacted dialkylphosphite, perhaps some mono- and/or di-phosphonated intermediate reaction products. The desired propane-1,2,3-triphosphonate ester compound distills around 170° C. at reduced pressure. This affords a convenient technique for preparing relatively pure triphosphonate ester compounds. For purposes of this invention, the materials distilling at a lower temperature than the triphosphonate can be discarded or used for any desired purpose.

Some of the desired propane-1,2,3-triphosphonate ester product may not be recovered by the aforementioned recovery process because during the reaction at temperatures above about 60°–70° C. there is a tendency for some of the sodium ions in solution to replace the ester groups on the phosphonate ester moiety forming partial sodium salts which are water soluble. Consequently, they would not be present in the organic phase which is the source of the desired triphosphonate esters according to the aforementioned simplified procedure.

The yields of the desired propane-1,2,3-triphosphonate ester can be considerably improved, therefore, by practicing a preferred embodiment for recovering the ester reaction product. This preferred embodiment calls for the additional steps of evaporating the organic solvent from the reaction mixture, dissolving the reaction mixture in water, passing the aqueous solution of the reaction mixture through a cationic ion exchanger, re-esterifying the ion exchanged reaction mixture by reacting it with a trialkylorthoformate, the alkyl group being a lower alkyl group which is the same as the alkyl groups in the hydrogen dialkylphosphite starting reactant, and recovering the resulting propane-1,2,3-triphosphonate ester by distillation, according to the procedure previously described.

According to this preferred embodiment, the organic solvent can be evaporated by any suitable means including distilling it off. The distillation or evaporation step can be performed within a temperature range of about 20° C. to 120° C., preferably from about 40° C. to about 100° C., and usually requires from about 10 to about 90 minutes.

The concentrated reaction mixture is then dissolved in water. The amount of water used is immaterial, since only enough should be used to dissolve the reaction mixture. The amount of water used can be about ½ to about 100 times the volume of the phosphonate ester; the preferred range being from about 2 to about 5 times the volume of the phosphonate ester.

The aqueous solution of the reaction mixture can be comprised of propane-1,2,3-triphosphonate esters, any partial sodium salts of the propane-1,2,3-triphosphonate ester as described above, sodium hydroxide, any hydrogen dialkyl phosphite which was not removed during evaporation of the organic solvent, sodium hydrogen monoalkyl phosphite partial salt, and possibly some monophosphonate or diphosphonate intermediate reaction products.

This aqueous solution is passed through a hydrogen cation ion exchanger such as a sulfonated hydrocarbon type, e.g., Dowex 50W–X8 ion exchange resin, marketed by Dow Chemical Company. A great number of cation exchange resins have been synthesized and are commercially available having a variety of cationic groups, e.g., —OH, —COOH, —SO$_3$H, —CH$_2$SO$_3$H. Any such ion exchange resins can be used; the only distinction between any of them for purposes of the present invention is that some may be more effective than others. All hydrogen cation exchangers, however, are operable. As a result of the hydrogen cation exchange step, the resulting reaction mixture will have all of the sodium replaced with hydrogen. The water may then be evaporated and the reaction mixture can be re-esterified by reacting with a trialkyl orthoformate, the alkyl group containing from 1 to about 6 carbon atoms. Preferably, the alkyl group of the re-esterifying agent should be the same as the alkyl groups of the starting hydrogen dialkylphosphite. This will simplify the recovery step; there is no advantage to having a mixed ester group. The trialkyl orthoformate compound can be trimethyl orthoformate, triethyl orthoformate, tripropyl orthoformate, triisopropyl orthoformate, tributyl orthoformate, tripentyl orthoformate, trihexyl orthoformate, tributyl orthoformate, tripentyl orthoformate, trihexyl orthoformate, and the like.

In the ordinary practice of the present invention, it is difficult to know exactly how much, if any, ester replacement by sodium occurs during the reaction. It is not necessary to know precisely how much trialkyl orthoformate should be used in the re-esterification step to replace the sodium ions. Full advantage of the invention can be had by using an amount of trialkyl orthoformate corresponding on an equimolar molar basis of the alkali promoter which is used. In other words, since the reaction as defined calls for from about 1.05 to 1.7 moles of alkali metal promoter, this same range applied to the esterifying agent. More than this amount of esterifying agent can be used, if desired, to make absolutely certain that complete re-esterification takes place. To add this extra precaution, the amount of re-esterifying agent should be in the range of 1.05 to 2.7 moles of agent, although from 1.05 to 1.7 is all that the reaction actually requires.

Following the re-esterification step, the acids (hydrogens) are all converted to the ester forms. There is thus present the hexaalkyl ester of propane-1,2,3-triphosphonic acid which can be easily recovered by the distillation procedure previously described. Lower alcohols, e.g., ethyl alcohol, and alkyl formate are also formed during the re-esterification step.

By employing the foregoing re-esterification procedure, it is possible to increase the yield from 5 to 60%. The improved yield which can be gained by using the additional recovery steps will depend upon how much ester replacement by sodium occurs during the initial reaction. For instance, within the given temperature range of 20° C. to 100° C., very little ester replacement occurs below 60° C. Consequently, if the reaction temperature is maintained below 60° C., there will be little advantage to be gained from employing the ion exchange/re-esterification steps. However, if the reaction temperature is allowed to reach temperatures up to 100° C., then the additional embodiment for increased yields may be very desirable. The ester replacement by the sodium ion can be thought of in terms of the following simplified illustration:

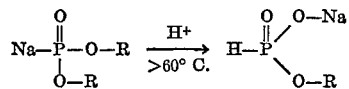

The esters of propane-1,2,3-triphosphonic acid can be readily hydrolyzed to the free propane triphosphonic acid by the exercise of any conventional hydrolysis step such as reacting the ester with hydrochloric acid as illustrated in the examples below. The free acid can be converted to any desired salt form by addition of a suitable base material, e.g., sodium potassium or lithium hydroxide, and the like.

The following examples are specific illustrations of the process embodiments described above and are in no way intended to limit the preceding discussion nor the proper scope of the present invention.

EXAMPLE I (1) Reaction.—Reaction apparatus consisted of a two-liter, three-neck flask which was fitted with a mechanical stirrer in the center neck; an offset addition funnel leading to an Allihn condenser (vented to the atmosphere through a gas outlet tube) in a side neck; and in the opposite neck, a "Y" adapter leading to a thermometer and a gas inlet tube. All equipment was baked at 110° C. for 30 minutes prior to assembly, and a stream of dry nitrogen was bled through the apparatus during the reaction.

Potassium (1.5 moles, 58.6 gms.) was combined with 250 ml. of toluene in the reaction flask and dispersed by stirring at 9,000 r.p.m. for 5 minutes at 110° C., then allowed to cool to room temperature. Four moles (552.4 gms.) of hydrogen diethyl phosphite [HPO$_3$(C$_2$H$_5$)$_2$] were added to the toluene-potassium mixture over a 40-minute period forming a reaction solution containing hydrogen diethyl phosphite and potassium diethyl phosphite. An acetone-Dry Ice bath was used to maintain a temperature of 0–5° C. as the potassium was consumed.

One mole (56.1 gms.) of propargyl alcohol

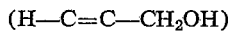

was added to the reaction solution over a 40-minute period. The exothermic reaction was allowed to heat to 75° C. and maintained there with a Dry-Ice bath during the remainder of the alcohol addition. After standing at room temperature for 16 hours, the product was heated to 80° C. for two hours. At this point, the dark liquid had a pH of about 9, as shown on pH test papers.

(2) Isolation of ester.—The toluene solvent and excess hydrogen diethyl phosphite in the reaction mixture were removed by distilling at <50° at 0.5 mm., Hg pressure. The residual material was dissolved in 800 ml. of water and eluted through Dowex 50W–X8 cation exchange resin (in the hydrogen form) to replace the potassium metal ions with hydrogen. Titration of an aliquot of the acidic solution with standard base showed that the 1.5 moles of potassium had been utilized essentially quantitatively in displacing ester groups.

The water solution was evaporated to dryness and twice azeotroped with benzene to dispose of all water. The acid residue was then reacted with 2.5 moles (1 mole excess) triethylorthoformate to re-esterify the acid groups via the following reaction:

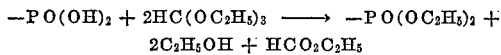

Ethanol and ethyl formate were evolved and collected in a Barrett collector and removed from the system during the reaction.

Distillation of the resulting ester product gave a 72% yield (based on the amount of HC≡CCH$_2$OH used) of hexaethyl propane-1,2,3-triphosphonate, B.P. 170° at 100$\mu$ pressure, $n_D^{25}$ 1.4513, $d_4^{25}$ 1.166. Molecular weight determined on a 3D 1 A Mechrolab osometer=425 (theory 452). The P$^{31}$MR spectrum showed a single unresolved peak at −28.5 p.p.m. (H$_3$PO$_4$ reference at 0 p.p.m.). Analysis: Calculated for C$_{15}$H$_{35}$O$_9$P$_3$ (percent): C, 39.8; H, 7.8; P, 20.5. Found (percent): C, 39.2; H, 8.1; P, 20.6.

(3) Isolation of sodium salt.—An 83-gram sample of the hexaethyl propane-1,2,3-triphosphonate was refluxed for 4 hours in an excess of concentrated HCl to convert to propane-1,2,3-triphosphonic acid. The solution was evaporated (under vacuum) to dryness, and azeotroped 3 times with isopropanol to dispose of traces of HCl and water. The residual acid was redissolved in 800 ml. of H$_2$O and aniline, in excess. The aniline not used for salt formation was removed by chloroform extraction and the resulting water solution evaporated to dryness to leave a white solid. This salt was crystallized four times from 6:1:3 isopropanol:methanol:acetone, each product having the same melting point of 195°. The aniline salt was dissolved in water and titrated to pH 8 with NaOH, and the freed aniline removed by chloroform extraction. The water solution was then evaporated to dryness to leave the white sodium salt of propane-1,2,3-triphosphonic acid.

The salt was converted back to the acid state by ion exchanging through Dowex 50W–X8 (H$^+$ form) cation exchange resin, and an aliquot of this acid titrated to determine endpoints. These endpoints occurred at pH 5.2, pH 8.15, and pH 10.51; the amount of standard base used to each endpoint was in the ratio of 3.0/0.96/0.91, respectively. The remaining propane-1,2,3-triphosphonic acid was then titrated to give the Na$_{4.5}$H$_{1.5}$ salt, which was recovered by simply evaporating to dryness. Analysis: calculated for C$_3$H$_{6.5}$O$_9$P$_3$Na$_{4.5}$ (percent): C, 9.4; H, 1.7; P, 24.3; Na, 27.0. Found (percent): C, 9.7; H, 1.9; P, 23.9; Na, 28.5.

EXAMPLE II

The reaction apparatus and procedure employed for this preparation was the same as that used in Example 1 except that the potassium was replaced with 1.5 moles of sodium. The sodium was dispersed in 250 ml. of toluene using the same dispersion technique as in Example I. After cooling to room temperature, 4 moles, 552.4 gms., of hydrogen diethyl phosphate was added over a 40-minute period. The reaction temperature was kept at 30–40° C. by cooling with a Dry Ice bath. The addition of one mole, 56.1 gms., of propargyl alcohol was the same as in Example I, including the post reaction heating to 80° for 2 hours.

The toluene solvent and excess hydrogen diethyl phosphite were removed by distilling at 50° C. at 0.5 mm. Hg pressure or less. The residual product was dissolved in 800 ml. of water and eluted through Dowex 50W–X8 cation exchange resin (H$^+$ form) to replace the sodium ions by hydrogen. The water was distilled off the acidic product, which was combined with excess concentrated HCl and refluxed for 7 hours. The solution was then evaporated to dryness and twice azeotroped with isopropanol to remove traces of HCl. Water (1400 ml.) was used to redissolve the remaining propane-1,2,3-triphosphonic acid, which was precipitated as aniline salt by adding 1000 ml. of aniline. The salt was filtered and purified further by recrystallization from 5.5:1 methanol-acetone, then from 5:25:1.5 water:methanol:acetone. The aniline salt was converted to sodium (Na) salt by titrating to pH 10.3 with sodium hydroxide and extracting the resulting solution 4 times with one liter portions of chloroform. The sodium salt was recovered by simply evaporating the water solution to dryness.

Analysis (on anhydrous basis): Found (percent): C, 8.8; H, 2.3; P, 24.6; Na, 30.6.

A sample of the above salt was converted to acid by eluting through Dowex 50W–X8 (H$^+$ form) ion exchange resin, then evaporating to dryness. Analyzed as acid: C, 12.5; H, 3.82; P, 53.2.

Results analogous to those of Example I can be obtained using molar equivalents of sodium or lithium in place of the potassium. Likewise, analogous results can be obtained by using molar equivalents of hydrogen dimethyl phosphite, hydrogen diisopropyl phosphite, hydrogen dihexyl phosphite in place of the hydrogen diethyl phosphite to Example I. The mole of propargyl alcohol can be replaced with a mole of propargyl chloride, propargyl bromide, propargyl iodide or propargyl orthotosylate and analogous results can be obtained. The triethylorthoformate re-esterifying agent can be replaced in Example I by an equivalent amount of a trialkylorthoformate in which the alkyl group corresponds to the aforementioned replacements for the hydrogen diethylphosphite, i.e., trimethyl orthoformate, triisopropylorthoformate, trihexylorthoformate.

BRIEF DESCRIPTION OF THE DRAWINGS (a) Phosphorus magnetic resonance (P$^{31}$MR) analysis was performed on compounds prepared by the present invention. It was discovered that the phosphorus atoms of propane-1,2,3-triphosphonate can be grouped into two kinds, ends and middles. These two kinds of phosphorus have the same chemical shift and therefore fall under the same peak when the P$^{31}$MR spectrum of either the ester or the acid is obtained. As the acid compounds are neutralized, however, it is interesting that the two kinds of phosphorus begin to exhibit different shifts and two regions of absorption are seen. FIG. 1 reproduces the P$^{31}$MR spectra obtained for propane-1,2,3-triphosphonic acid, as well as for sodium salts, at different stages of neutralization of the acid.

Figure 2:
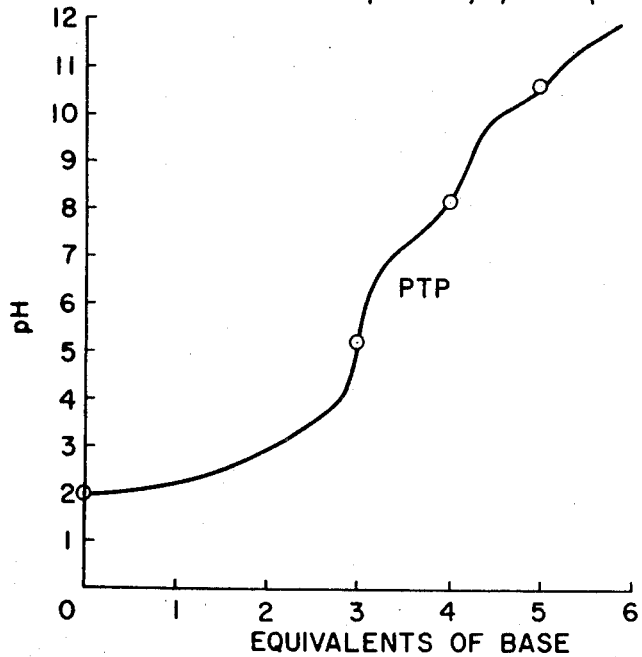

(b) The titration curve for propane-1,2,3-triphosphonic acid is reproduced in FIG. 2. These breaks can be seen in the titration of this acid corresponding to the titration of 5 of the 6 acidic hydrogens. This curve shows the relative acid strengths of the protons of the acid.

Figure 3:
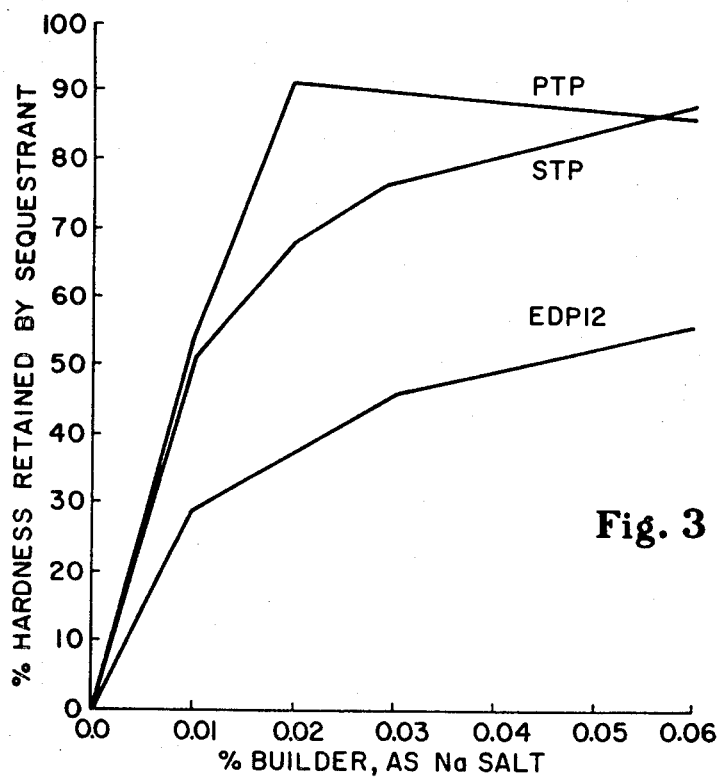

(c) The unexpectedly notable sequestering properties of propane-1,2,3-triphosphonate compounds is shown in FIG. 3. The test used to idscover these properties is called a Swatch-Dip test which measures the relative sequestering ability of a compound by employing a fabric-swatch impregnated with soap and an aqueous solution containing a predetermined level of calcium hardness minerals. Briefly, the procedure calls for preparing an aqueous solution containing the hardness ions, and dipping into it or immersing into it a fabric-swatch which has been impregnated with a measured amount of soap. The swatch remains in the solution for a predetermined amount of time. A measurement is then made to determine the amount of free calcium which has been adsorbed by the fabric-swatch. The identical procedure is then repeated but with a predetermined concentration of a sequestrant compound added to the aqueous solution containing the calcium ions. Measurements of adsorbed calcium are again made and comparisons drawn. Differences between the amounts of calcium adsorbed in tests with and without sequestrants, is attributed to the ability of the sequestrant to tie-up or sequester the calcium and thereby decrease the level of free calcium ion concentration available for adsorption by the immersed fabric swatch. A percentage is obtained in this manner called "percent hardness retained by sequestrant." Several tests were conducted in this manner using sodium tripolyphosphate (STP), sodium ethane-1,2-diphosphonate (EDP 12), and sodium salts of propane-1,2,3-triphosphonic acid. The results are given in FIG. 3. It can be seen that ethane-1,2-diphosphonate reached a maximum percentage of about 56% retained hardness at a concentration of 0.06% in the aqueous solution. At a concentration of 0.03% the level fell to about 46%; at .01%, the figure fell to 29%. Sodium tripolyphosphate by comparison sequestered 88% at 0.06% concentration, but 77% at 0.03% concentration, 68% at .02% and 51% at .01%. Below .03% concentration, both STP and EDP 12 fall off markedly in their efficiency. However, it can be seen from FIG. 3 that not only did propane-1,2,3-triphosphonate equal STP at .06% in performance but exceeded it significantly until at .02% concentration it reached 91.4% hardness retained; by comparison, at .02% concentration the STP only sequestered 68%. At .01% concentration, the sodium propane-1,2,3-triphosphonate sequestered 54.3% which is almost equal to the figure for sodium ethane-1,2-diphosphonate at .06%. This demonstration not only serves to show the superior efficiency of the compounds of the present invention over a well-known sequestrant such as STP but also to demonstrate the surprising improvement between somewhat structurally related compounds, i.e., ethane-1,2-diphosphonate and propane-1,2,3-triphosphonate.

FURTHER DESCRIPTION OF THE INVENTION

That the compounds of this invention are such efficient sequestrants suggests their use in numerous applications in which hardness minerals represent a problem. For instance, the present invention can provide an improved process for treating aqueous solutions, e.g., water softening, by adding to the solution an effective amount of a triphosphonate compound. Among other applications for which the compounds of this invention can be useful are descaling of textiles in which alkaline earth metals have been deposited; lessening of ash content in fabrics which have been treated with pyrophosphate containing washing agents; in cleaning processes such as in washing bottles in which precipitation of calcite is a problem; as additives to dyebaths, agricultural uses such as making up concentrates of herbicides and plant treating compositions; and numerous others mentioned, for example, in the literature such as "Organic Sequestering Agents," authored by S. Chabarek and A. Martell, published in 1959 by John Wiley & Sons, Inc., NewYork, N.Y.

The alkali metal salts of the present invention, as well as the acid, can also be used as builders in detergent compositions. In such an application, the alkali metal propane-1,2,3-triphosphonate builders are mixed with organic synthetic detergents in a proportion of builder to detergent in the range of 10:1 to about 1:5, and preferably 6:1 to about 1:2. Such compositions are most effective in aqueous solutions having a pH of about 8 to 12, and preferably 9 to 11. At these pH's it will be appreciated the propane-1,2,3-triphosphonic acid would be converted, in situ, to a salt form. From a formulation standpoint, therefore, it is immaterial whether one begins with a salt or the acid form.

The organic synthetic detergents can be anionic soap and non-soap synthetic detergents, nonionic synthetic detergents, ampholytic synthetic detergents, or synthetic detergents. Mixtures of these detergents in any proportions can likewise be used. Cationic compounds can also be used, either in admixture just with the builder component or in admixture with other organic detergents and builders.

In addition, numerous other materials can be used in formulating a complete built detergent composition to make it more effective or attractive. The following are mentioned by way of example only: Alkali metal carboxymethylcellulose and structurally related compounds (ethyl, propyl) to serve as inhibitors of soil redeposition; tarnish inhibitors (e.g., benzotriazole); fluorescers, brighteners, corrosion inhibitors, coloring agents, perfumes, pH adjusters, moisture silicates, sulfates, hydrotropic agents, enzymes, and the like. Other builder compounds can also be used selected from inorganic alkaline builder salts (such as phosphates, polyphosphates, pyrophosphates, and the like), organic alkaline sequestering builder salts such as nitrilotriacetates, ethylenediaminetetraacetate, carboxylates, polycarboxylate builder salts, alkylene polyphosphonates such as methylene diphosphonates, ethane-1-hydroxy-1,1-diphosphonic acid, ethane-1-hydroxy-1,1,2-triphosphonates and the like.

The built detergent compositions can be formulated as solid formulations, e.g., powders, flakes, tablets, bars, etc., or as liquids having aqueous or organic solvent bases.

A unique property of the alkali metal salts of propane-1,2,3-triphosphonic acid which suggests their special usefulness in formulating liquid detergent compositions is the outstanding solubility of these compounds in water. It has been discovered that the alkali metal salts of propane-1,2,3-triphosphonic acid, e.g., sodium and potassium propane-1,2,3-triphosphonates exhibit solubilities of greater than 53% in water. Unlike other phosphonates with low solubility or with relatively high solubility in a rather narrow pH range, all alkali metal salts of propane-1,2,3-triphosphonate are very soluble. This desirable characteristic enhances greatly the versatility of these compounds for various detergent formulations, especially built liquid detergent compositions.

This unique water solubility characteristic was demonstrated by the following procedure. The various sodium salts of propane - 1,2,3 - triphosphonic acid were prepared as solids, and each then combined with a limited amount of water in attempting to establish solution-solid equilibrium. However, no true solid phase could be established. On addition of water, all the solids went to viscous gums in which no crystals could be detected microscopically after standing for 2 days at 80° F. This viscous material simply became less viscous as more water was added.

In order to establish minimum solubility values for the salts, samples of the clear viscous masses were weighed, and then reduced to anhydrous by drying in an Alderhalten drying apparatus with $P_2O_5$ over boiling xylene. The weights of the dry salts then allowed calculation of the percent solid in solution. The values obtained are given below:

TABLE I

| | Na salt | | | |
|---|---|---|---|---|
| | 3 | 4 | 5 | 6 |
| PTP | 66 | 62 | 63 | 53 |

By virtue of the capacity of the compounds of this invention to inhibit the crystal growth and development of calcium hydroxylapatite, they are useful as anti-calculus agents in oral compositions as more fully described and claimed in a concurrently filled copending, commonly assigned patent application of Homer W. McCune and Nathaniel B. Tucker having Ser. No. 693,713, said application being abandoned in favor of Ser. No. 731,312 which is now U.S. Pat. 3,488,419. This concurrently filed patent application is incorporated herein by reference.

What is claimed is:

1. A process for preparing lower alkyl esters of propane-1,2,3-triphosphonic acid which comprises reacting
   (A) a propargyl compound having a formula $$H-C \equiv C-CH_2X$$

in which X is selected from the group consisting of bromine, chlorine, iodine, hydroxyl, and ortho-tosyl,
   (B) a hydrogen dialkyl phosphite ester in which the alkyl group is a lower alkyl group containing from 1 to about 6 carbon atoms, and
   (C) a reaction promoter which is an alkali metal selected from the group of consisting of sodium, potassium, and lithium, or a hydride thereof,
   at a temperature in the range of from about 20° C. to about 100° C., for from about five minutes to about 30 hours,
   said hydrogen dialkyl phosphite ester being present in the reaction in excess of a molar proportion of 4:1, said phosphite to said propargyl compound,
   said alkali metal promoter being present in the reaction at a molar proportion of from about 1.05:1 to about 1.7:1, promoter to propargyl compound.

2. A process described in claim 1 wherein said propargyl compound is one in which X is hydroxyl or bromide.

3. A process described in claim 1 wherein said hydrogen dialkyl phosphite ester is selected from hydrogen dimethyl phosphite, hydrogen diethyl phosphite, and hydrogen diisopropyl phosphite.

4. A process described in claim 1 wherein the reaction temperature is in the range of from about 50° to about 80° C.

5. A process described in claim 1 wherein said propargyl compound and said hydrogen dialkyl phosphite ester are present in a molar proportion in a range of from about 1:4 to about 1:10, propargyl compound: phosphite.

6. A process described in claim 5 wherein said propargyl compound and said hydrogen dialkyl phosphite are present in a molar proportion in a range of from about 1:4 to about 1:6, propargyl compound:phosphite.

7. A process described in claim 1 wherein the alkali metal promoter is present at a molar proportion of promoter: propargyl in the range of about 1.05:1 to about 1.5:1.

References Cited
UNITED STATES PATENTS
2,681,920   6/1954   Van Winkle et al. __ 260—932 X LEWIS GOTTS, Primary Examiner A. H. SUTTO, Assistant Examiner U.S. Cl. X.R.

252—80, 89, 175, DIG. 17; 260—502.4 P, 932, 978